C. H. GRAVES.
TOLL CLOCK.
APPLICATION FILED DEC. 11, 1914.

1,178,229.

Patented Apr. 4, 1916.

WITNESSES
L. Douville,
D. F. Nagle.

INVENTOR
Carleton H. Graves.
BY Wiedersheim & Fairbanks,
ATTORNEYS

UNITED STATES PATENT OFFICE.

CARLETON H. GRAVES, OF PHILADELPHIA, PENNSYLVANIA.

TOLL-CLOCK.

1,178,229.  Specification of Letters Patent.  Patented Apr. 4, 1916.

Application filed December 11, 1914. Serial No. 876,637.

*To all whom it may concern:*

Be it known that I, CARLETON H. GRAVES, a citizen of the United States, residing in the city and county of Philadelphia, State of Pennsylvania, have invented a new and useful Toll-Clock, of which the following is a specification.

My invention relates to a new and useful toll clock for telephones, wherein I provide means which is under the control of the user of the telephone to indicate and determine beyond a doubt the amount of time consumed during a telephone conversation wherein the charge therefor is made depending upon the time the caller has been in communication.

The invention consists of a single movable indicator with means for actuating the same and with means for controlling the actuating means, with a dial face having graduations thereon arranged in multiples of a minimum toll period, with an insignia to indicate when the time limit has been reached.

It further consists of other novel features of construction, all as will be hereinafter fully set forth.

For the purpose of illustrating my invention, I have shown in the accompanying drawing one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1:
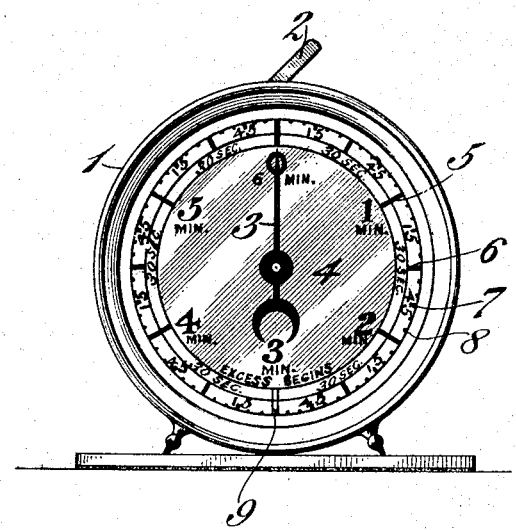
Figure 2:
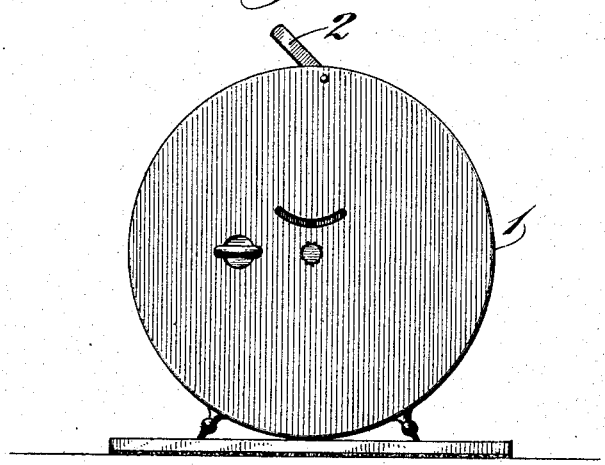

Figure 1 represents a front elevation of a toll clock embodying my invention. Fig. 2 represents a rear elevation thereof.

Similar numerals of reference indicate corresponding parts in the figures.

Referring to the drawings: 1 designates a casing having suitable clock mechanism (not shown) contained therein, provided with suitable means for winding the mechanism and with a manually operable member or lever 2 for starting and stopping the clock mechanism.

3 designates a single movable indicator or pointer suitably mounted upon a shaft of the operating mechanism in order that suitable motion will be imparted to said indicator.

4 designates a dial face for the register upon which are graduations arranged in multiples of three. The large graduations 5, as will be seen, serve to indicate intervals of minutes, while intermediate graduations 6, between each of the main graduations, serve to indicate intervals of thirty seconds. Between each of the main graduations and the intermediate graduations, are smaller graduations 7, which serve to indicate intervals of fifteen seconds, while still smaller graduations 8 may be provided, each to indicate intervals of five seconds.

9 designates an insignia arranged preferably at the three minute graduation and preferably of a contrasting color to the other graduations, to indicate when the time limit of a telephone call has been reached.

It will be understood that the pointer or indicator 3 is normally positioned at zero which is at the upper portion of the face of the dial and at the bottom thereof, is the insignia 9 for indicating the time limit, whereby the toll clock will serve to indicate the time consumed by the call; when the time limit has been reached, and the excess time begins, the graduations following the excess insignia will serve to indicate the excess time consumed beyond the time limit.

It will be understood that by reason of the manually operated lever 2, the subscriber can start the operation of the actuating mechanism when the conversation begins and the indicator will be actuated and when the conversation is finished the user moves the lever 2 to stop the mechanism and immediately the indicator will stop, so that the clock will give a positive and accurate indication of the total amount of time of the conversation.

Special attention is directed to the fact that in the preferred form illustrated, the neutral position of the indicator is vertical and that when the time limit of three minutes, for example, is reached, the indicator has made one-half of a revolution. The advantage of this is that no mental process is necessary for the user to determine when the time limit has been reached, since he can see at a glance that one-half of a revolution has been made.

By the employment of my present invention, there is no guess work about the amount of time used, and since the party telephoning has before him a visible indicator to accurately and visibly indicate the amount of time which has been used, such party can speak in his natural voice without hurrying his message and thereby obtain the full amount of time and service for which he is paying. Furthermore, the nervous strain which is ordinarily present in long distance telephoning is practically eliminated by the use of my present invention, and one is enabled to talk much more easily and naturally than is possible under present conditions, since one is at all times aware of the expenses incurred and can govern his conversation accordingly. It will also be seen that by the use of my present invention, if, for any reason, the telephone service is interrupted, the toll clock or meter may be arrested in its movement and then started when the service is resumed.

It will now be apparent that I have devised a novel and useful toll clock, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A dial for toll clocks, comprising a disk having graduations arranged in multiples of a minimum toll period to indicate minutes and defined by minute marks, and an insignia at the first minimum toll period mark to indicate the expiration of the minimum toll period.

2. A dial for toll clocks, comprising a disk having graduations arranged in multiples of three to indicate minutes and defined by minute marks and an insignia at the first three minute mark to indicate the expiration of a time limit.

3. A dial for toll clocks, comprising a disk having graduations arranged in multiples of three to indicate minutes and defined by minute marks, intermediate division marks between each minute mark to indicate thirty seconds, intermediate division marks between the thirty second marks to indicate fifteen seconds, and an insignia at the three minute mark to indicate the prescribed time limit.

4. A dial for toll clocks, comprising a disk having an inner circle provided with divisions to indicate minutes and defined by minute marks, an intermediate circle bisected by the minute divisions and having divisions intermediate thereof to indicate half minutes, an outer circle subdivided by the minute divisions and the half minute divisions and having divisions to indicate quarter minutes, and an insignia at the three minute mark to give a visual indication when the time limit is reached.

CARLETON H. GRAVES.

Witnesses:
H. S. FAIRBANKS,
C. D. McVAY.

Copies of this patent may be obtained for five cents each, by addressing the "Commissioner of Patents, Washington, D. C."